United States Patent
Azzi et al.

(10) Patent No.: US 9,511,772 B2
(45) Date of Patent: Dec. 6, 2016

(54) ANALYSIS OF THE BEHAVIOUR OF A VEHICLE BRAKING SYSTEM WITH A DECOUPLED PEDAL

(71) Applicant: RENAULT s.a.s., Boulogne-Billancourt (FR)

(72) Inventors: Hamid Azzi, Maurepas (FR); Guillermo Pita-Gil, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 45 days.

(21) Appl. No.: 14/402,393

(22) PCT Filed: May 17, 2013

(86) PCT No.: PCT/FR2013/051094
§ 371 (c)(1),
(2) Date: Apr. 14, 2015

(87) PCT Pub. No.: WO2013/175114
PCT Pub. Date: Nov. 28, 2013

(65) Prior Publication Data
US 2015/0307104 A1    Oct. 29, 2015

(30) Foreign Application Priority Data

May 22, 2012    (FR) ..................... 12 54642

(51) Int. Cl.
*G06F 7/00*    (2006.01)
*B60W 30/18*    (2012.01)
(Continued)

(52) U.S. Cl.
CPC ........... *B60W 30/18127* (2013.01); *B60T 1/10* (2013.01); *B60W 10/184* (2013.01);
(Continued)

(58) Field of Classification Search
CPC ............... B60W 10/08; B60W 10/188; B60W 30/18127; B60W 10/184; B60W 2050/0089; B60T 2270/604; B60T 2270/608
(Continued)

(56) References Cited

U.S. PATENT DOCUMENTS 5,892,437 A * 4/1999 Scheibe ................ B60T 17/221
340/438
2003/0184155 A1* 10/2003 Crombez .................. B60L 7/26
303/152
(Continued)

FOREIGN PATENT DOCUMENTS

WO    2011 132074    10/2011
WO    2011 143165    11/2011

OTHER PUBLICATIONS

French Search Report Issued Apr. 5, 2013 in French Application No. FR 1254642 Filed May 22, 2012.
(Continued)

*Primary Examiner* — Shardul Patel
(74) *Attorney, Agent, or Firm* — Oblon, McClelland, Maier & Neustadt, L.L.P.

(57) ABSTRACT

A diagnostic method for an a posteriori analysis of behavior of a vehicle braking system, the braking system including a regenerative braking mechanism, an additional braking mechanism, and a distribution device, the method including storing, in a non-volatile memory, at least one current value of a braking parameter from the distribution device for subsequent analysis based on the at least one value stored in the non-volatile memory, wherein the storage is triggered by execution of at least one event.

9 Claims, 3 Drawing Sheets

(51) Int. Cl.
*B60W 10/184* (2012.01)
*B60T 1/10* (2006.01)
*B60W 50/00* (2006.01)

(52) U.S. Cl.
CPC ........ *B60W 20/14* (2016.01); *B60T 2270/604* (2013.01); *B60W 2050/0089* (2013.01); *B60W 2520/10* (2013.01); *B60W 2530/14* (2013.01); *B60W 2540/12* (2013.01)

(58) Field of Classification Search
USPC .................... 701/1, 70, 33.4; 188/1.11 R
See application file for complete search history.

(56) References Cited

U.S. PATENT DOCUMENTS

| | | | | |
|---|---|---|---|---|
| 2006/0089791 A1* | 4/2006 | Hay | ................ | G01C 21/28 |
| | | | | 701/498 |
| 2009/0299578 A1* | 12/2009 | Lucas | ................ | B60R 21/013 |
| | | | | 701/46 |
| 2010/0179714 A1* | 7/2010 | Tani | ................ | B60K 6/445 |
| | | | | 701/22 |
| 2011/0276245 A1* | 11/2011 | Krueger | ................ | B60T 8/17616 |
| | | | | 701/71 |
| 2011/0307130 A1* | 12/2011 | Gow | ................ | B60G 17/0195 |
| | | | | 701/22 |
| 2012/0056470 A1* | 3/2012 | Kim | ................ | B60L 7/18 |
| | | | | 303/3 |
| 2012/0074768 A1* | 3/2012 | Naito | ................ | B60T 1/10 |
| | | | | 303/3 |
| 2013/0041565 A1* | 2/2013 | Fujiki | ................ | B60T 1/10 |
| | | | | 701/70 |
| 2013/0158741 A1* | 6/2013 | Hahne | ................ | G08B 21/06 |
| | | | | 701/1 |
| 2013/0245883 A1* | 9/2013 | Humphrey | ................ | G07C 5/0841 |
| | | | | 701/36 |
| 2014/0144728 A1* | 5/2014 | Szeto | ................ | B60T 8/172 |
| | | | | 188/1.11 R |

OTHER PUBLICATIONS

International Search Report Issued Oct. 30, 2013 in PCT/FR13/051094 Filed May 17, 2013.

* cited by examiner

ANALYSIS OF THE BEHAVIOUR OF A VEHICLE BRAKING SYSTEM WITH A DECOUPLED PEDAL

The invention relates to the a posteriori analysis of the behavior of a vehicle braking system with decoupled pedal.

The vehicle can, for example, be an electric or hybrid vehicle.

On a vehicle equipped with at least one electric traction or propulsion engine, it is possible, under certain conditions, to use the electric engine as generator and thus obtain an electric braking means. Such a use is advantageous because it is regenerative, it makes it possible to recover a portion of the energy in order to recharge the batteries.

When the driver presses on the brake pedal, a global braking setpoint obtained from this pedal can be at least partly transformed into a regenerative braking setpoint, for example into an electric braking setpoint.

The applicant has thus developed a braking system for a motor vehicle equipped with a regenerative braking means, for example an electric braking means, and equipped with a complementary braking means, for example a hydraulic braking means. This braking system notably comprises a distribution device, for example incorporated in one or more processor(s), arranged to generate, from a global braking setpoint obtained from the driver brake pedal, a regenerative braking setpoint intended for the regenerative braking means, and a complementary braking setpoint intended for the complementary braking means.

This braking system has been developed by attempting to take into account the problems considered likely to occur when using the vehicle.

For example, a switchover from an all-electric braking to all-hydraulic braking may be accompanied by a short variation of the braking torque actually applied. The user can thus have a brake release sensation linked to such a gap in deceleration. The as yet unpublished patent application FR1159106 describes a method that makes it possible to remedy this problem.

Nevertheless, there is a need for a better understanding of the behavior of a vehicle braking system with decoupled pedal, notably in a situation of actual use.

A diagnostic method is proposed for an a posteriori analysis of the behavior of a vehicle braking system, the braking system comprising a regenerative braking means, a complementary braking means, and a distribution device arranged to generate, from a global braking setpoint, a regenerative braking setpoint intended for the regenerative braking means, and a complementary braking setpoint intended for the complementary braking means. The method comprises:

a storage step for storing, in a non-volatile memory, at least one current braking parameter value obtained from the distribution device for a subsequent analysis based on said at least one value stored in the non-volatile memory, the storage step being conditional on the execution of at least one event.

Thus, such a recording of current data of the braking system can make it possible to better check the reliability of the braking system, in as much as these data correspond to real driving situations.

The stored values obtained from the distribution device can be, for example:

setpoint signal values, for example received from the distribution device, for example regenerative and/or complementary braking setpoint values, values that are a function of setpoint signal values, for example received from sensors, for example a torque value applied by an actuator communicating with the distribution device, values generated as a function of the values stated above, for example a braking distribution ratio between the regenerative braking means and the complementary braking means, and/or other values.

The expression "braking control signal" should be understood to mean both a braking setpoint, generated by the distribution device, and a signal corresponding to a control actually applied by a braking means. The stored value can, for example, be a braking control signal or else have been generated from one or more braking control signal(s).

The stored values can, for example, comprise the regenerative braking setpoint value, a master cylinder pressure value, or other value. In fact, the invention is limited by the nature of the braking parameter(s) only in as much as this or these parameter(s) is/are at least partly obtained from the distribution device, it being understood that the parameters relating to the regenerative braking means and to the complementary braking means are obtained from the distribution device.

According to the invention, provision is made for the storage step to be conditional on the execution of at least one event.

In effect, retaining in memory all the current values of the electric braking setpoint, of the hydraulic braking setpoint, of the master cylinder pressure, and/or of other values relating to the braking system, throughout the duration of a mission, could involve memory size overruns, or else impose constraints on the manufacturer as to the size of the memories installed in the vehicle. By making this storage subject to a condition, it is possible to reconcile the limitation on the quantity of recorded data and the relevance of the recorded data.

Advantageously, and in a nonlimiting manner, the method can comprise a step of detecting a driver braking request, and the storage step can be performed in the case of detection of a driver braking request. Thus, the data relating to the braking system is recorded following a use of this braking system.

The method can, for example, comprise a step of reception of a signal from a brake pedal position sensor, a brake pedal system pressure sensor, a stop light switch-on signal, and/or another signal.

This storage of data relating to the braking system following a braking request from the driver can make it possible to better understand the behavior of the braking system, by being based on the stored data.

Advantageously, and in a nonlimiting manner, the method can comprise a step of detecting events corresponding to abrupt variations of at least one vehicle control signal, for example of the regenerative braking setpoint and/or of the master cylinder pressure. When such a detection is made, the storage of data relating to the braking system can be executed.

In effect, such abrupt variations may correspond to a particular vehicle situation, or even to a particular sensation for the driver. Storing data relating to the behavior of the braking system when such a situation occurs can, again, make it possible to better understand and better analyze the behavior of this braking system.

Advantageously, and in a nonlimiting manner, the method can comprise a step of detecting a rapid changeover from one braking means to the other.

For example, provision can be made to regularly compare the regenerative and/or complementary braking control values obtained from the distribution device, and, when the difference between two consecutive regenerative braking control values and/or between two consecutive complementary braking control values is above a respective threshold, to consider that there has been a rapid changeover from one actuator to the other. Such an abrupt changeover from one actuator to the other can be likened to a risky situation because of the possible brake release sensation for the driver.

Thus, the method can comprise a test step consisting in comparing, to a threshold, the variations of a regenerative braking control, for example the signal corresponding to the braking torque actually applied, and/or of the complementary braking control, for example a cylinder pressure value or even a hydraulic braking setpoint signal value generated by the distribution device.

Advantageously, and in a nonlimiting manner, the detection step can consist in receiving a control signal obtained from an active safety system, for example the ABS (anti-lock braking system), the ESP (electronic stability program) and/or the MSR (from the German "Motor Schlepp Regelung"). If such a safety system is required to be engaged, then it can be considered that the vehicle is in a very particular situation, and that the analysis of the behavior of the braking system may be fruitful.

Advantageously, and in a nonlimiting manner, provision can be made to prevent the storage of the data relating to the braking system when the speed of the vehicle is below a threshold. This can make it possible to avoid retaining in memory data that do not correspond to an actual braking situation during an actual driver mission.

Advantageously, and in a nonlimiting manner, provision can be made to compare, to a threshold, a difference between a vehicle odometry value from a preceding memory storage of parameter values relating to the braking system, and the current odometry value, and to prevent the storage if this difference is below a threshold. In other words, any write into memory corresponds to a certain mileage completed since the previous write. Here again, this can make it possible to avoid storing non-relevant values in memory.

Advantageously, and in a nonlimiting manner, provision can be made for the step of storing in the non-volatile memory to comprise a step of writing in a volatile memory, and a step of writing in the non-volatile memory if an end of mission is detected.

This can make it possible to limit the number of write operations to the non-volatile memory. In effect, any failures generally correspond to an end of mission, such that this copy into the non-volatile memory at the end of mission only can make it possible to reconcile the number of writes in the non-volatile memory and the relevance of the stored data.

Advantageously, and in a nonlimiting manner, it is possible to detect the end of mission upon the nominal switching off of a computer and/or if an airbag triggering signal is received. In effect, if an airbag is triggered, the computer may be switched off abruptly, in order to avoid any risk of fire. Thus, by likening the triggering of the airbag to an end of mission, it can be made possible to store data corresponding to an airbag triggering situation, and therefore probably relevant data, even if the computer is not then switched off normally.

Advantageously, and in a nonlimiting manner, provision can be made to store, in addition to the current braking parameter value(s), one or more additional value(s) corresponding to one or more instant(s) prior to and/or after the current instant. In other words, data are collected over a time window, corresponding, for example, to a duration of the order of a second, in order to better understand the behavior of the braking system during a critical period.

Advantageously, and in a nonlimiting manner, this or these additional value(s) can be chosen as a function of the type of event having triggered the execution of the storage step. Thus, the start and/or the end of the time window during which the backup is executed can be adjusted according to the type of event detected. For example, if a braking request is detected, it may be preferable to store more values following the detection than values prior to this detection. On the other hand, if the ABS or similar is triggered, provision will be able to be made to store a certain number of values corresponding to instants preceding the instant of the triggering of the ABS, in order to better understand what might have led to this triggering situation.

A computer program product is also proposed, comprising the instructions for executing the steps of the method described above.

This method can notably be implemented in digital signal processing means, for example a processor.

The computer program can, for example, be stored in a memory medium, for example a hard disk, or even be downloaded from a communication network, or similar.

A diagnostic device is also proposed, for an a posteriori analysis of the behavior of a braking system of a motor vehicle, the braking system comprising a regenerative braking means, for example an electric braking means, a complementary braking means, for example a hydraulic braking means, and a distribution device arranged to generate, from a global braking setpoint obtained from a brake pedal, a regenerative braking setpoint intended for the regenerative braking means, and a complementary braking setpoint intended for the complementary braking means. The device comprises storage means for storing, in a non-volatile memory, at least one current braking parameter value obtained from the distribution device for a subsequent analysis based on this at least one stored value.

This device can, for example, comprise or be incorporated in a processor, for example a microcontroller or similar.

This device can comprise means for receiving a set of at least one braking parameter value, comprising at least one value obtained from the distribution device, for example a cylinder pressure value and/or a complementary braking setpoint value. The reception means can, for example, comprise an input pin, an input port or similar.

The storage means can, for example, comprise a processor core or CPU (central processing unit).

The diagnostic device may also comprise the actual non-volatile memory, and possibly a volatile memory for temporary storage.

A braking management system for a vehicle is also proposed, comprising a regenerative braking means and a complementary braking means, this braking management system comprising a distribution device suitable for generating, from a global braking setpoint value obtained from a user interface, a regenerative braking setpoint intended for the regenerative braking means, and a complementary braking setpoint intended for the complementary braking means. The system also comprises a diagnostic device as described above. This system can, for example, comprise or be incorporated in a processor, for example a microcontroller, a microprocessor or similar.

A vehicle is also proposed, for example an electric and/or hybrid motor vehicle, comprising a braking management system as described above and/or a braking system, and/or a diagnostic device as described above.

The invention will be better understood with reference to the figures, which illustrate nonlimiting embodiments.

Figure 1:
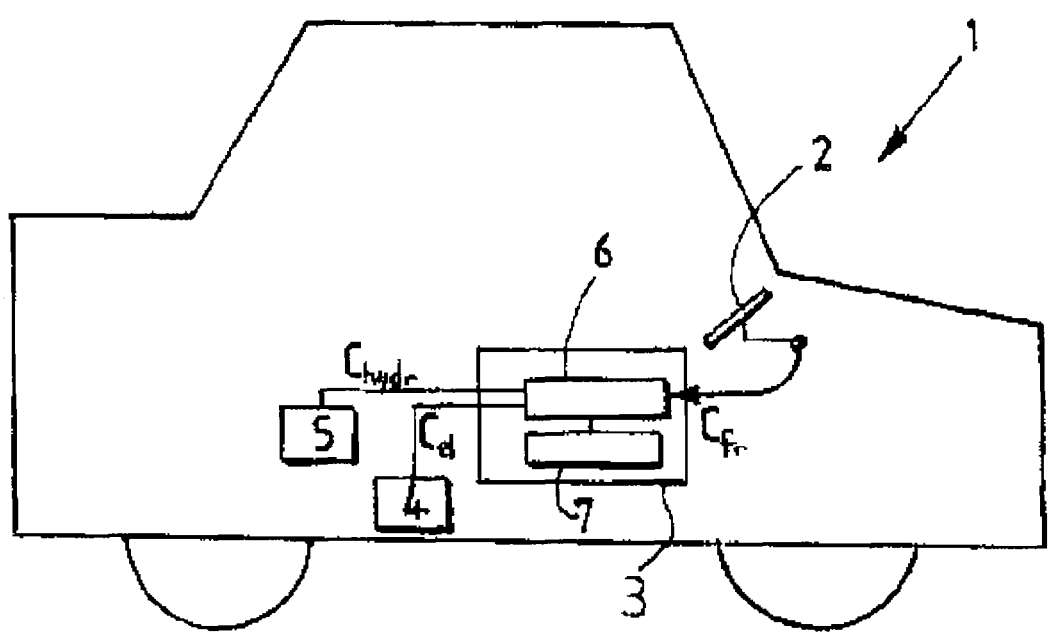
FIG. 1 shows an example of a vehicle according to an embodiment of the invention.

Referring to FIG. 1, the vehicle 1, for example an electric or hybrid vehicle, comprises a brake pedal 2, an electric braking means schematically represented by the reference 4, and a hydraulic braking means schematically represented by the reference 5.

The vehicle 1 further comprises a braking management system, for example a computer 3.

This computer 3 includes a distribution device 6 suitable for generating, from a global braking setpoint signal $Cf_r$ from the pedal 2, an electric braking setpoint signal $C_e i$ intended for the electric actuator 4, and a hydraulic braking setpoint signal (Chydr) intended for the hydraulic actuator 5.

The computer 3 further comprises a diagnostic device 7 arranged in such a way as to perform certain backups of parameter values for the computer 3.

Figure 2:
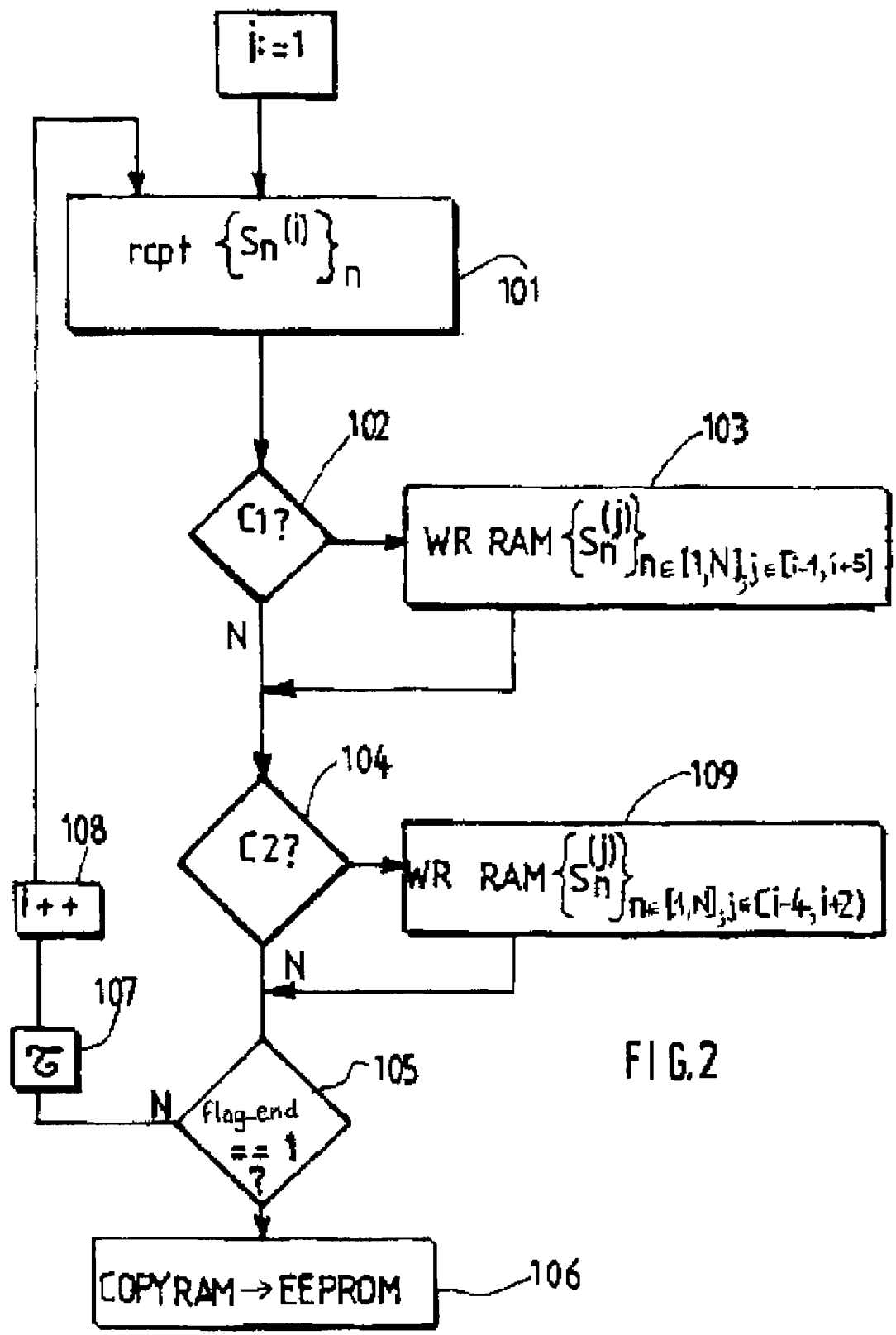
FIG. 2 shows a flow diagram of an example of a method according to an embodiment of the invention.

Referring to FIG. 2, the diagnostic device referenced 7 in FIG. 1 regularly receives a set of N values of signals $\{S_n^{(i)}\}$ relating to the braking system, in steps 101. The index n varies from 1 to N.

These sets of N values taken in the cycle i can comprise values of:
signals obtained from brake pedal position sensors,
flag signal indicating that the stop lights are switched on,
signal obtained from a pedal pressure sensor,
global braking setpoint signal obtained from the driver interface,
hydraulic braking setpoint signal generated by the distribution device,
electric braking setpoint signal generated by the distribution device,
electric control signal actually applied,
signal obtained from a master cylinder pressure sensor,
vehicle speed signal,
steering wheel angle signal,
flag signals indicating the triggering of active safety systems, ABS, ESP, ASR (from the German "Antriebs-Schlupf-Regelung"), MSR (from the German "Motor Schleppmoment Regelung"), or similar,
airbag triggering command signals, and/or
vehicle odometry signals.

In a test 102, the computer determines, from at least some of the signal values received, whether the braking system is invoked by the driver, that is to say whether the driver is pressing on the brake pedal. This determination will be described in more detail with reference to FIG. 3.

If the test 102 is positive, then all the signals received in the step 101 are copied into a RAM memory, in a step 103, and this is done over a certain number of cycles indexed i, as explained later.

The computer determines, during a test 104, whether the vehicle is in a situation corresponding to abrupt variations of a control signal, notably of one of the signals from active safety systems, of the electric braking control signal actually applied, of the electric braking setpoint signal and/or of the hydraulic braking setpoint signal. This determination will be described in more detail with reference to FIG. 3.

If the test 104 is positive, that is to say if it is found that some signals from the braking device vary abruptly, then the signal values received in the step 101 are copied into a RAM memory during the step 109, once again for some of the cycles i.

The stored values notably comprise:
a regenerative braking control value, for example an electric braking setpoint signal value generated by the distribution device, an electric control signal value actually applied, and/or similar, and/or
a complementary braking control value, for example a hydraulic braking setpoint signal value generated by the distribution device, a signal value obtained from a master cylinder pressure sensor, and/or similar.

Provision can be made to retain, in a buffer memory, a plurality of sets of N values $\{S_n^{(i)}\}$, each set of values of this plurality corresponding to a time-related sample. Thus, in addition to the set of N values $\{S_n^{(i)}\}$ corresponding to the current instant, at least one other set of N values corresponding to an instant prior to and/or later than this current instant is stored.

When the test 102 is positive, that is to say if the computer detects a braking request on the part of the user, it will be possible to provide for a plurality of sets of N values to be copied, for example a set of N values preceding the sample indexed i, the set of N values corresponding to the cycle i and five sets of N values corresponding to respective subsequent cycles. These seven sets of N values are written into a register corresponding to this braking request detection.

In effect, if driver braking is detected, it is in fact more relevant to store more data from the braking system following this detection than data prior to this detection.

When the test 104 is positive, then, during the step 109, the set of values received in the $i^{th}$ cycle (that is to say the current set of values), is written into the RAM memory, together with a plurality of sets of values received during cycles preceding and following the current cycle, for example four sets of N values corresponding to time-related samples prior to the time-related sample corresponding to the current cycle and two sets of N values corresponding to time-related samples following the time-related sample corresponding to the current cycle. In other words, the backup window is shifted to the instants preceding the detection of a risky situation, and this is done in order to better understand the causes of these abrupt variations. These seven sets of N values are written into a register corresponding to this abrupt variation detection.

In order to be able to write into RAM memory values corresponding to prior cycles, it will be possible to provide a buffer memory for at least some of the N signals received in the step 101. For each of these signals, this buffer memory can, for example, make it possible to store seven values. For an 80 ms sampling interval, seven values thus make it possible to cover a period of close to 480 ms. For example, it will be possible to provide a buffer memory for each of the signals received in the step 101, apart from the odometry signal because, over a period less than a second, the variations of this signal, for example accurate to within a meter, are meaningless.

The diagnostic device referenced 7 in FIG. 1 comprises a certain number of registers, for example ten registers, some of these registers being allocated to the execution of an event corresponding to an abrupt variation of a control signal (condition C2), and the others of these registers being allocated to the execution of an event corresponding to a pressure on the brake pedal (condition C1).

For example, of the ten registers of the diagnostic device 7, seven registers correspond to the execution of condition C1, and three registers correspond to the execution of condition C2.

Thus, the diagnostic device can store the values corresponding to seven brake pedal pressure detections, and to three detections of abrupt control signal variations.

These registers can be written and overwritten during one and the same mission. When the number of writes into volatile memory linked to a condition C1 or C2 exceeds the number of registers allocated to these respective conditions, for example, upon the eighth detection of driver braking during one and the same mission, the register written first is overwritten with the new data. This can be done using a so-called FIFO (first in, first out) method.

To return to FIG. 2, the computer detects, during a test 105, an event corresponding to an end of mission. More specifically, the test 105 is positive in the case of nominal switching off of the computer, that is to say upon the reception of a computer switch-off command signal, or else upon the reception of an airbag triggering signal.

If the test 105 is positive, for example if a flag signal indicating an end of mission flag_end has a value equal to 1, then the content of the RAM memory written during one or more step(s) 103, 109 of one or more prior cycles, that is to say the content of the ten registers mentioned above, is copied into a non-volatile memory during a step 106.

The content of this non-volatile memory will be able to be read subsequently, in order to better understand how the braking system has worked. These data will be able to make it possible to understand the root of any problem, for example identify a faulty actuator, or a malfunctioning of a sensor.

On the other hand, if the test 105 is negative, the computer switches to a waiting state for an inter-cycle time τ, during a step 107, then the value i indexing the cycles is incremented during a step 108. N new values, corresponding to the next cycle, are then received during the step 101.

Figure 3:
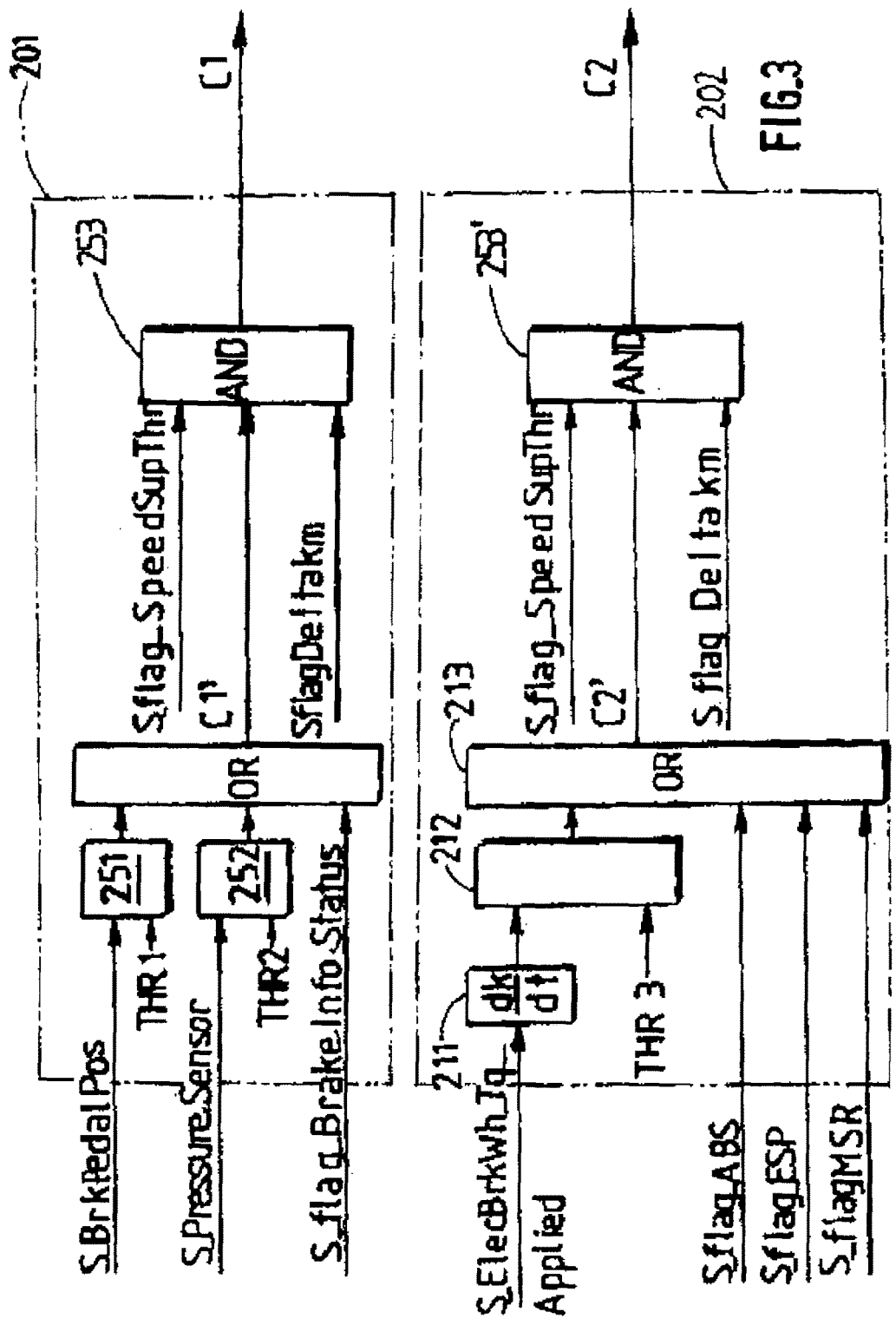
FIG. 3 shows a part of an example of a diagnostic device according to an embodiment of the invention.

Referring to FIG. 3, a module 201 for detecting the event C1 comprises means 251 for comparing a brake pedal position sensor signal S_BrkPedalPos to a threshold THR1.

Comparison means 252 make it possible to compare a signal from a pressure sensor S_PressureSensor to a threshold THR2.

If the signal from the position sensor S_BrkPedalPos exceeds the first threshold THR1, if the signal from the pressure sensor S_PressureSensor exceeds the second threshold THR2, or if a stop light switch-on signal S_flag_BrakeInfoStatus has a value equal to 1, then a first output signal C1' takes the value 1.

Moreover, the module 201 comprises an AND gate 253, receiving as input the signal C1', as well as a flag signal S_flag_SpeedSupThr whose value is equal to 1 only when the speed of the vehicle is above a predetermined threshold.

The AND gate 253 also receives a signal SflagDeltakm whose value is equal to 1, if, and only if, the difference between the odometry of the vehicle upon the last recording and the current odometry of the vehicle is greater than a predetermined threshold.

If these three signals S_flag_SpeedSupThr, C1' and SflagDeltakm all have values equal to 1, then the output signal C1 is equal to 1. In other words, the test 102 of FIG. 3 is considered as positive.

The diagnostic device further comprises a module 202 that makes it possible to detect whether the condition C2 is executed.

This module 202 comprises a differentiator module 211 suitable for performing a time-related derivative of an electric control signal actually applied S_ElecBrk-Wh_Tq_Applied.

Alternatively, it would be possible, for example, to provide for this module 211 to receive as input an electric braking setpoint signal, and/or a hydraulic braking setpoint signal generated by the distribution device referenced 6 in FIG. 1.

A module 212 makes it possible to compare the time-related derivative of this control signal S_ElecBrk-Wh_Tq_Applied to a predetermined threshold THR3. If this control signal difference is greater than the threshold THR3, then the module 212 generates a signal equal to 1.

The module 202 further comprises an OR gate 213 receiving as input:
the signal from the module 212,
a flag signal S_flag_ABS signaling the triggering of an ABS system,
a flag signal S_flag_ESP obtained from an ESP regulation system and signaling the triggering of an ESP regulation, and
a flag signal S_flagMSR obtained from an MSR regulation system and signaling the triggering of an MSR regulation.

If one of these flag signals has a value equal to 1, then the OR gate 213 generates a signal C2' equal to 1.

An AND gate 253' receives as input the flag signal S_flag_SpeedSupThr, the signal C2' from the OR gate 213 and the signal SflagDeltakm. If these three signals have a value equal to 1, then this AND gate 253' generates a signal C2 equal to 1.

The invention claimed is:

1. A diagnostic method for a posteriori analysis of behavior of a vehicle braking system, the braking system including regenerative braking system, complementary braking system, and a distribution device configured to generate, from a global braking setpoint, a regenerative braking setpoint configured for the regenerative braking system, and a complementary braking setpoint configured for the complementary braking system, the method comprising:
storing, in a non-volatile memory, at least one current braking parameter value obtained from the distribution device for a subsequent analysis based on the at least one value stored in the non-volatile memory; and
detecting, via circuitry, a rapid changeover from the regenerative braking system to the complementary braking system and/or a rapid changeover from the complementary breaking system to the regenerative braking system,
wherein the storing is conditional on execution of at least one event, the at least one event including detection of a rapid changeover.

2. The method as claimed in claim 1, further comprising:
detecting a driver braking request,
wherein the storage is performed following detection of a driver braking request.

3. The method as claimed in claim 1, further comprising:
detecting a triggering of an active safety system,
wherein the storage is performed following the detecting of the triggering.

4. The method as claimed in claim 1, further comprising:
comparing a current vehicle speed value to a speed threshold; and
comparing a vehicle odometry difference value between a current instant and an instant corresponding to a preceding memory storage to a distance threshold, wherein the memory storage is performed only if the current speed value is above the speed threshold and if the odometry difference value is above the distance threshold.

5. The method as claimed in claim 1, further comprising:
writing the at least one current braking parameter value in a volatile memory;
detecting an end of mission; and
copying into the non-volatile memory at least a part of the content of the volatile memory.

6. The method as claimed in claim 1, wherein, in addition to the at least one current braking parameter value, at least one additional value of the braking parameter, corresponding to at least one respective instant prior to and/or following a current instant, is stored.

7. The method as claimed in claim 6, wherein:
a number of event types condition execution of the storage,
the at least one additional value is chosen as a function of a type of event having triggered the execution of the storage.

8. A diagnostic device for a posteriori analysis of behavior of a braking system of a motor vehicle, the braking system including regenerative braking system, complementary braking system, and a distribution device configured to generate, from a global braking setpoint obtained from a brake pedal, a regenerative braking setpoint configured for the regenerative braking system, and a complementary braking setpoint configured for the complementary braking system, the device comprising:
circuitry configured to
store, in a non-volatile memory, at least one current braking parameter value obtained from the distribution device for a subsequent analysis based on the at least one stored value,
detect a rapid changeover from the regenerative braking system to the complementary braking system and/or a rapid changeover from the complementary breaking system to the regenerative braking system,
wherein the storing is conditional on execution of at least one event, the at least one event including detection of a rapid changeover.

9. A vehicle comprising:
the regenerative braking system, the complementary braking system, the distribution device, and the diagnostic device as claimed in claim 8.

* * * * *